July 12, 1927.

J. A. HUDSON

AUTOMATIC SWITCH FOR FILM REWINDERS

Filed March 1, 1926

1,635,478

Inventor

James A. Hudson.

By Adam E. Fisher.

Attorney

Patented July 12, 1927.

1,635,478

UNITED STATES PATENT OFFICE.

JAMES A. HUDSON, OF BORGER, TEXAS.

AUTOMATIC SWITCH FOR FILM REWINDERS.

Application filed March 1, 1926. Serial No. 91,374.

This invention is an automatic switch for film rewinding machines, as used for rewinding moving picture films; and the object of the invention is to provide a simple, practical and efficient automatic switch for stopping the motor driven rewinding machine when the reel of film is completely rewound, or when the film is being wound too loosely or in case the film should break.

In the drawing

Figure 1:
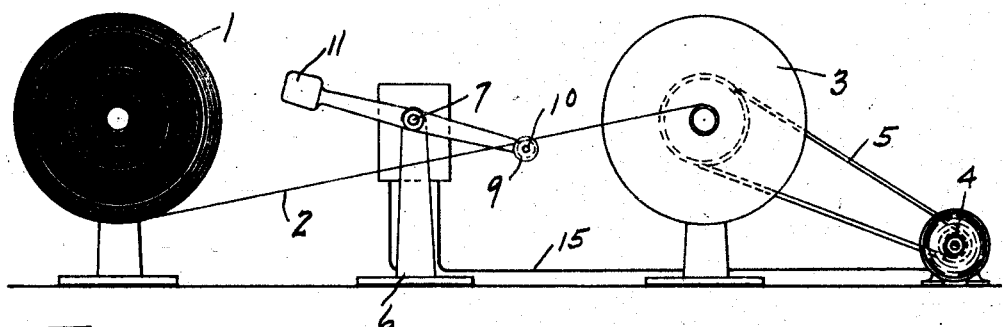
Figure 1 is a side elevation of the switch mechanism shown in association with the motor driven rewinding reel and the delivering reel.
Figure 2:
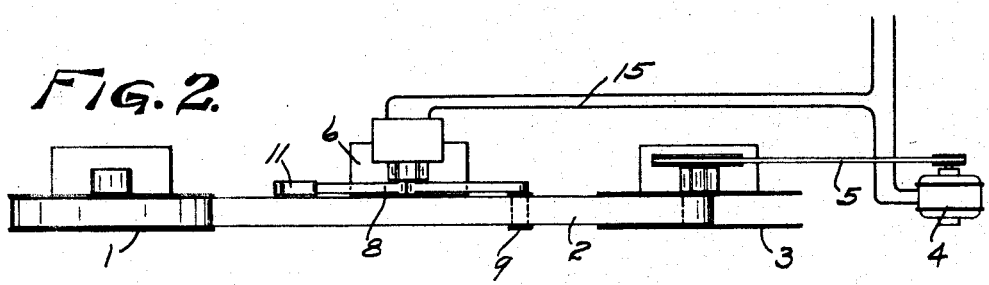
Figure 2 is a plan view of the assembly.
Figures 3, 4:
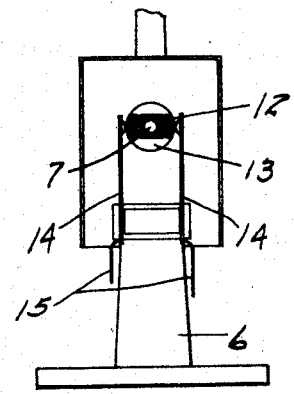
Figure 3 is a rear elevation of the switch mechanism detached from the reels, showing the switch closed.
Figure 4 is a view similar to Figure 3, showing the switch open.

The invention is for use in connection with the delivery reel 1, from which the film 2 is being rewound onto the receiving reel 3 by means of an electric motor 4 transmitting its power through the belt 5 to the said receiving reel 3. The invention proper comprises a pedestal 6 mounted between and in alignment with the two mentioned film reels. Journaled through the top of this pedestal is a short shaft 7, and a trip arm 8 is rigidly attached at one end of this shaft, the shaft connecting with the arm at an approximate medial point on the arm. A roller 9 is journaled on a pin 10 set in one end of the arm 8, and the opposite end of the arm 8 is counterbalanced as shown at 11, whereby the normal tendency of the arm 8 is to assume an approximate vertical position. A drum 12 of insulation material is mounted upon the opposite end of the shaft 7, and an elongated electrical contact element 13 is mounted upon this drum. The insulated spring terminals 14 of the electrical conductors 15 which run to the motor 4 are fastened to the pedestal 6 and adapted to bear against and engage the drum 12 and the contact 13 in such position that when the roller 9 is depressed beneath the strip of film 2 running between the reels 1 and 3, the circuit will be closed through the conductor 15; but upon the film being completely unwound from the reel 1, or upon its breaking or running too loose, the arm 8 will assume its vertical position through the weighted end 11, which will operate to rotate the contact 13, break the circuit through the conductor 15 and so stop the motor and the reel 3.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In combination with a film delivering reel and an electrically driven film receiving reel, an automatic switch mounted between the two reels and in alignment therewith, the said switch comprising a pedestal; a shaft journaled through the top of the pedestal; a trip arm rigidly mounted at one end of the shaft, the shaft connecting with the arm at a medial point on the arm; a roller journaled at one end of the arm and adapted to be disposed beneath the strip of film running between the two reels; a counterweight at the opposite end of the arm adapted to normally swing the arm to a vertical position; a drum of insulation upon the opposite end of the said shaft; an electrical contact element mounted upon the said drum of insulation; the terminals of the electrical conductors leading to the said motor being so mounted relative to the said contact element as to bear against the said drum and contact element so that the circuit through the conductors will remain closed with the said trip arm standing in an approximate horizontal position, but will be broken upon the arm assuming its normal vertical position.

2. In a device of the kind described the combination with a pedestal and a shaft journaled through the top of the pedestal of a counterbalanced trip arm at one end of the shaft; a film contact element at the end of the arm opposite to the counterbalanced end thereof, the said film contact element being adapted to bear against the underside of the film; a drum of insulation mounted on the other end of the said shaft; an electrical contact element mounted upon the said drum; and electrical conducting elements mounted relative to the said contact element so as to bear against the said drum and contact element so that the circuit through the conductors will remain closed with the said trip arm standing in an approximate horizontal position, but will be broken upon the arm assuming its normal vertical position.

3. In a device of the kind described and in combination with film delivery and receiving reels with a strip of film connecting the two; an automatic switch comprising a pedestal positioned between the reels; a shaft journaled through the pedestal; a trip arm at one end of the shaft, the said arm being joined to the shaft at a medial point of the arm; a counterweight at one end of the arm to normally throw the arm to a vertical position; a roller at the opposite end of the arm adapted to traverse the under side of the strip of connecting film; a drum of insulation mounted on the other end of the said shaft; an electrical contact element mounted upon the said drum; and electrical conducting elements mounted relative to the said contact element so as to bear against the said drum and contact element so the circuit through the conductors will remain closed with the said trip arm standing in an approximate horizontal position, but will be broken upon the arm assuming its normal vertical position.

4. In a film rewinding mechanism embodying electrically operated film delivery and receiving reels and a strip of film running from the former to the latter; a device of the kind described, comprising a trip arm pivotally mounted at a medial point of the arm and adapted to rotate in a vertical plane; an element at one end of the arm adapted to traverse the under side of the said strip of film; a counterweight at the opposite end of the said arm adapted normally to rotate the arm to a vertical position; and an insulated contact drum connected to and rotating with the said trip arm, the said contact drum being so coordinated with the electric conductors of the mechanism as to close the circuit therethrough when the said trip arm is in an approximate horizontal position with the said traversing element at the under side of the strip of film, and to break the circuit when the trip arm is released from the film and assumes its vertical position through the action of the said counterweight.

5. In a film rewinding mechanism embodying electrically operated film delivery and receiving reels and a strip of film running from the former to the latter; the combination with a traversing element adapted to engage the underside of the said film of a trip arm pivotally mounted at a medial point of the arm and adapted to rotate in a vertical plane and having the said traversing element mounted at one end of the said trip arm; a counterweight at the opposite end of the said arm adapted normally to rotate the arm to a vertical position; and an insulated contact drum connected to and rotating with the said trip arm, the said contact drum being so coordinated with the electric conductors of the mechanism as to close the circuit therethrough when the said trip arm is in an approximate horizontal position with the said traversing element at the under side of the strip of film, and to break the circuit when the trip arm is released from the film and assumes its vertical position through the action of the said counterweight.

In testimony whereof I affix my signature.

JAMES A. HUDSON.